(12) United States Patent
Jarr et al.

(10) Patent No.: US 10,723,566 B2
(45) Date of Patent: Jul. 28, 2020

(54) DEVICE FOR LIFTING ONE OR A PLURALITY OF ARTICLES FROM A ROLLER CONVEYOR

(71) Applicant: Dematic GmbH, Heusenstamm (DE)

(72) Inventors: Daniel Jarr, Offenbach (DE); Max Reinhard Lewandoske, Aschaffenburg (DE); Daniel Huberth, Aschaffenburg (DE)

(73) Assignee: Dematic GmbH, Heusenstamm (DE)

( * ) Notice: Subject to any disclaimer, the term of this patent is extended or adjusted under 35 U.S.C. 154(b) by 0 days.

(21) Appl. No.: 16/279,641

(22) Filed: Feb. 19, 2019

(65) Prior Publication Data

US 2019/0256298 A1 Aug. 22, 2019

(30) Foreign Application Priority Data

Feb. 21, 2018 (DE) .................. 10 2018 103 896

(51) Int. Cl.
*B65G 47/64* (2006.01)
*B65G 47/57* (2006.01)
*B65G 47/51* (2006.01)
*B66F 9/02* (2006.01)
*B66F 9/12* (2006.01)

(52) U.S. Cl.
CPC ....... *B65G 47/643* (2013.01); *B65G 47/5181* (2013.01); *B65G 47/57* (2013.01); *B66F 9/02* (2013.01); *B66F 9/12* (2013.01); *B65G 2201/02* (2013.01); *B65G 2207/14* (2013.01); *B65G 2207/18* (2013.01)

(58) Field of Classification Search
CPC ............ B65G 2201/02; B65G 2207/14; B65G 2207/18; B65G 47/643; B65G 47/54; B65G 47/57; B65G 47/5181; B65B 25/02; B66F 9/02; B66F 9/12
USPC ......................................................... 198/434
See application file for complete search history.

(56) References Cited

U.S. PATENT DOCUMENTS 3,904,045 A * 9/1975 Thibault ............. B65G 57/303
414/788.9
4,199,287 A * 4/1980 Salts ................... B65G 57/302
414/792.6
4,764,074 A * 8/1988 Postigo ................ B65G 57/303
414/789.1
2005/0225028 A1 10/2005 Lawless et al.
(Continued)

FOREIGN PATENT DOCUMENTS

DE 3206083 A1 11/1982
DE 4303413 A1 8/1994
(Continued)

*Primary Examiner* — Gene O Crawford
*Assistant Examiner* — Lester Rushin, III
(74) *Attorney, Agent, or Firm* — Gardner, Linn, Burkhart & Ondersma LLP (57) ABSTRACT

Device for lifting an article from a roller conveyor having a fork that can be raised and lowered, and having a plurality of spaced-apart elongate tines which, in the lowered position, move with the tines between or below the rollers of the roller conveyor in order to lift one or a plurality of articles from the rollers as the fork is being raised into the raised position with the tines, where the tines form a carrier surface for the article and the tines can be expanded in the direction transverse to the longitudinal extension thereof in order to form an expanded carrier surface.

18 Claims, 5 Drawing Sheets

(56) References Cited

U.S. PATENT DOCUMENTS

2013/0223962 A1 8/2013 Ellington et al.
2019/0389671 A1* 12/2019 Cohen ................. B65G 1/0492

FOREIGN PATENT DOCUMENTS

| DE | 102015210052 A1 | 12/2016 |
| EP | 2450295 A1 | 5/2012 |
| GB | 2486593 A | 6/2012 |
| WO | 2011059297 A2 | 5/2011 |

* cited by examiner

DEVICE FOR LIFTING ONE OR A PLURALITY OF ARTICLES FROM A ROLLER CONVEYOR

CROSS REFERENCE TO RELATED APPLICATION

The present application claims priority of German patent application DE 10 2018 103 896.8, filed Feb. 21, 2018.

BACKGROUND AND FIELD OF THE INVENTION

The invention relates to a device for lifting one or a plurality of articles from a roller conveyor by a fork which can be raised and lowered having one or a plurality of spaced-apart elongate tines which, in the lowered position, are lowered with the tines between or below the rollers of the roller conveyor in order to lift the article(s) from the rollers as the fork is being raised into the raised position with the tines, wherein the tines form a carrier surface for the article.

The use of forklifting devices is known for lifting objects from the rollers of roller conveyors or lowering them onto the rollers thereof by means of tines of the fork engaging between the rollers. Particularly small goods, however, which are transported on roller conveyors can slip, tip over or fall when being lifted by means of a conventional fork mechanism or belt lifting mechanism. In particular in the area of packet transportation, this problem cannot always be avoided by using smaller roller and fork spacings. Nevertheless, during transportation of these small goods, it must also be possible to effect lifting in order thus to carry out e.g. intermediate buffering or changing of the transportation sequence.

SUMMARY OF THE INVENTION

The present invention provides a device configured to be able to lift smaller objects from conveyor rollers or lower them onto the rollers.

In accordance with aspects of the invention it has become known that when the tines can be expanded in the direction transverse to the longitudinal extension thereof in order to form an expanded carrier surface it becomes possible, owing to the enlarged support surface, to prevent slipping, tipping-over or even falling of small objects or articles. That is, the carrier surface of the tines is expanded when picking up (lifting) the articles in order to form a secure standing surface (in a reversible manner).

For this purpose in order to effect the expansion in an embodiment of the present invention each tine comprises at least one support which can be folded out transversely to the longitudinal extension thereof. The support thus folds out laterally of the longitudinal extension of the tine. In a particular preferred embodiment the at least one fold-out support can be folded open by up to 90 degrees in order to form a flat carrier surface, i.e. it forms a flat support surface for the articles. In a further particular embodiment when each tine comprises two fold-out supports that can each be folded out to one side, and possibly also the width of the at least one fold-out support corresponds to about half the distance between the centers of the rollers, an almost flat or even totally flat support surface can be provided when handling the articles. Moreover, when the fork is in the lowered position the tines are disposed such that articles can be conveyed past and over them on rollers of the conveyor.

In one embodiment, provision is made that the at least one support that can be folded out is held together (flush with the rest of the tine) by a vertical guide when the fork is in the lowered position. Thus the lateral folding-out of the support with respect to the rest of the tine is prevented e.g. mechanically by a guide which laterally retains the tine and the fold-out support thereof. The guide could be formed e.g. by a vertically orientated U-shaped profile.

In order to effect easy folding-in of the support during lowering, provision can be made that the vertical guide comprises a funnel-shaped inlet. Therefore, as the tine is being lowered, the support is folded-in into a vertical position into the guide by force but gently so that it can be inserted between the rollers. The support can be folded out mechanically (slotted link, lever mechanism) or actively via an actuator (actuating drive, pneumatic cylinder, etc.). In particular, the use of a spring force or magnetism is feasible.

In one embodiment, the device comprises at least two forks that can be raised and lowered, are disposed one above the other and are each formed with one or a plurality of spaced-apart elongate tines with supports which can be folded out. Thus articles can be lifted one above another in succession at the same conveyor point. In other words, the forks travel with their tines one after another or one behind another into the same guide between the rollers during raising or lowering.

A particular application of the present invention is one using a temporary buffering device that is fitted with a roller conveyor and at least one device, preferably a plurality of devices, disposed along the conveying path of the roller conveyor. Thus articles can be lifted temporarily in order to remove them out of the conveying path and later to bring them therein in order to buffer them or in order to change the sequence of the articles.

These and other details of the present invention will become clear from the following description of exemplified embodiments with reference to the drawing.

DESCRIPTION OF THE PREFERRED EMBODIMENTS

The present invention will now be described with reference to the accompanying drawings. The drawings illustrate a device designated as a whole by 1 for lifting or lowering an article 100 from a roller conveyor 2 in accordance with the present invention.

In the illustrated embodiment, the device 1 comprises a frame 3 which comprises two vertically orientated and horizontally space-apart rails 4 on which is disposed a fork 5 which can be raised and lowered in the direction of the arrow Z and has a plurality of spaced-apart elongate tines 6. The frame 3 is disposed laterally next to the roller conveyor 2 such that the tines 6 of the fork 5 extend between the rollers 2A but the base of the fork can be guided past the rollers 2A.

During lifting, the tines 6 form a carrier surface 7 for the article 100. In the lowered (bottom) position, the fork 5 is disposed with the tines 6 between the rollers 2A of the roller conveyor 2 such that articles 100 can be conveyed past in an entirely normal manner. When articles are to be lifted, the fork 5 is moved upwards in the rail 4, whereby the article 100 is lifted from the rollers 2A by the tines 6. Thus, the tines 6 form a carrier surface 7 for the article 100.

In accordance with an aspect of the present invention, the carrier surface 7 can be expanded in the direction transverse to the longitudinal extension of the tines 6, i.e. in the conveyor direction X of the roller conveyor, in order to form an expanded carrier surface 7. For this purpose, each tine 6 comprises two supports 8 which can be folded out transversely to the longitudinal extension thereof. In an alternative embodiment it would also be feasible to use only one support.

These are designed to fold open by up to 90 degrees in order to form a flat carrier surface 7, for which purpose they are each articulated on the carrier part 9 via a hinge 10 on the tine 6. Each support 8A, 8B which can be folded out is thus folded out to one side and the width 11 thereof (in the folded-out position or the height thereof in the folded-in position) corresponds approximately to half the mutual spacing 12 between the centers 13 of the rollers. In order to be folded-out the fold-out supports 8A, 8B comprise, for example, springs integrated in the hinge 10 (and thus not visible). Alternative configurations may be employed.

In order that the fold-out supports 8A, 8B are, or remain, folded-in in the lower position, or the position lowered between the rollers 2A, a vertical guide 14 is provided (and correspondingly disposed) for each tine 6, which in addition comprises a funnel-shaped inlet 15 so that the folded-out supports 8A, 8B are moved into, and held in, the folded-in positions by force during downwards travel. The vertical guides 14 are thus each disposed centrally between the rollers 2A and extend downwards from the rollers 2A so that the folded-out supports 8A, 8B of the tines 6 are brought together and held during entry into the guides by the converging walls 16 of the inlet 15. The vertical guides 14 can thus be designed as U-shaped profiles which bend in the inlet 15.

In order to lift an article 100, the fork 5 is thus moved upwards with the tines 6 along the rails 4 in a controlled manner (e.g. guided by a controller and suitable sensor), wherein the tines 6 exit the vertical guide 14 and therefore the supports 8A, 8B are each folded open towards the side and thus form an expanded flat support or carrier surface 7 for the article 100.

Figure 1:
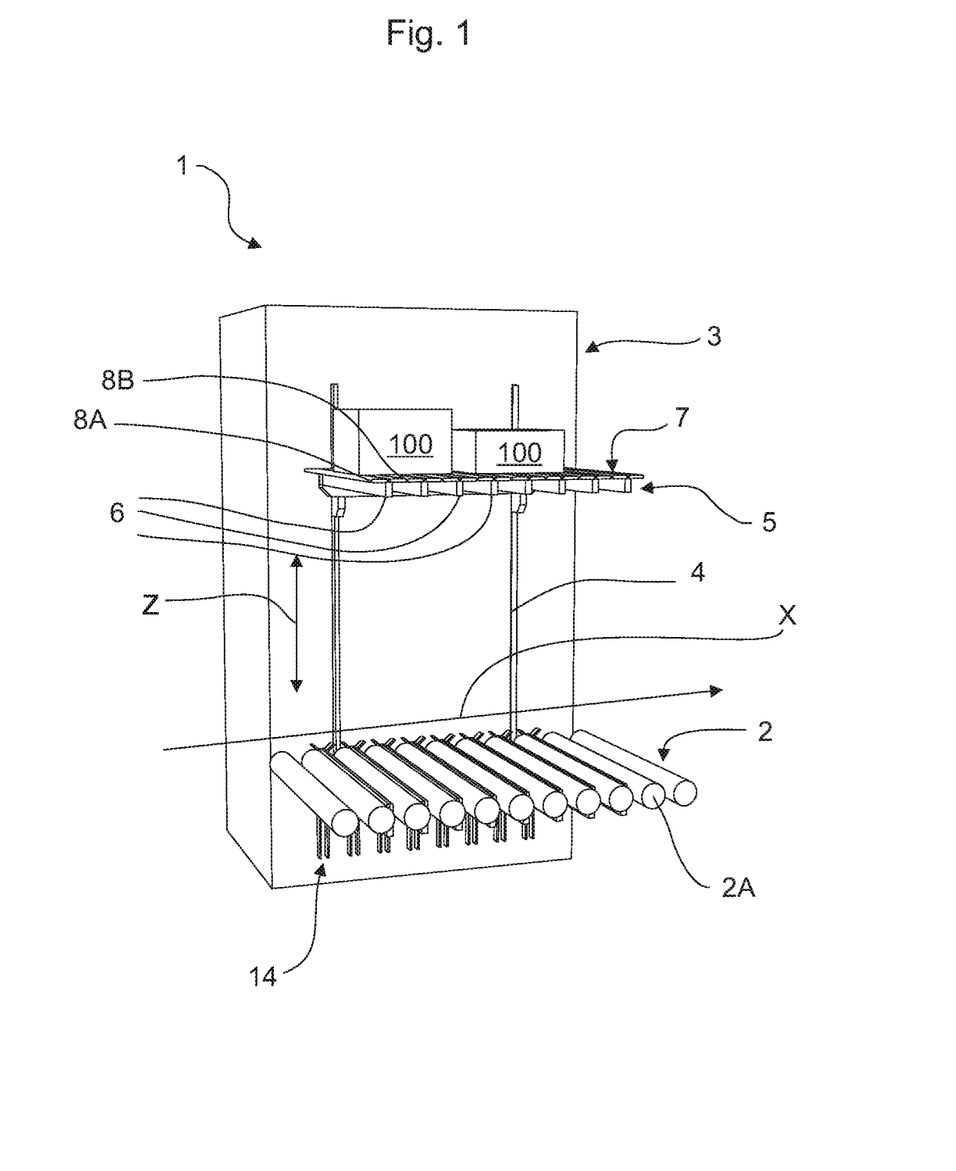
FIG. 1 is a schematic perspective view of a device for lifting one or a plurality of articles from a roller conveyor in accordance with aspects of the present invention.
Figure 2:
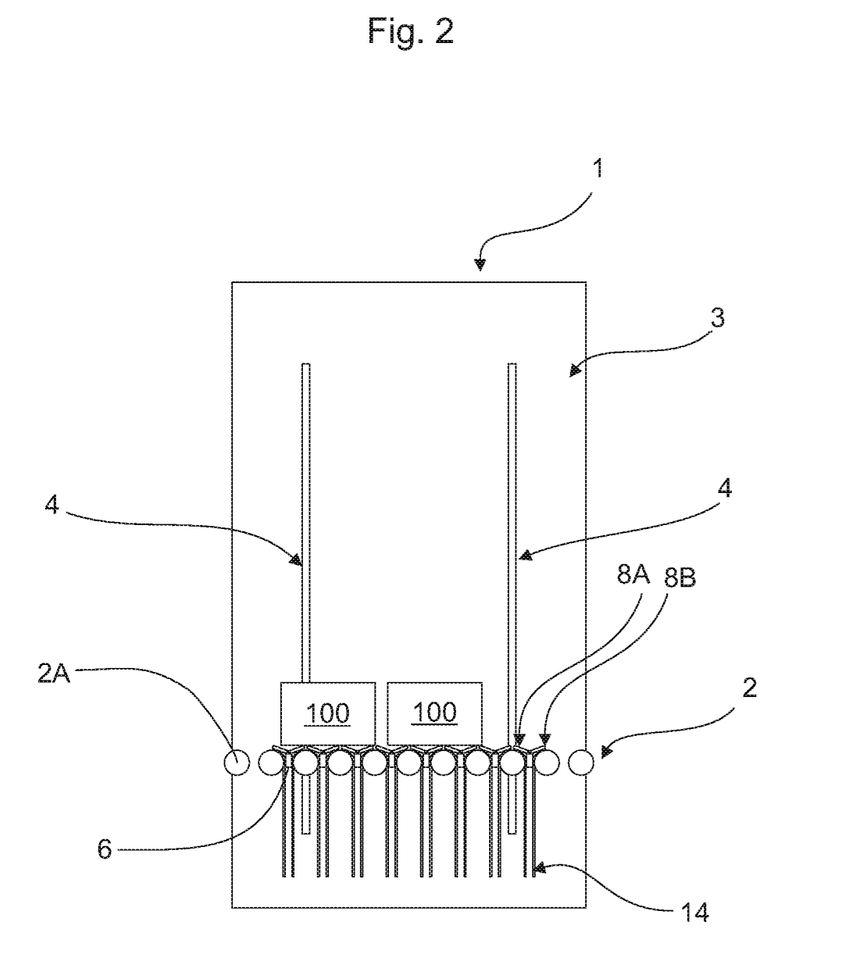
FIG. 2 is a front view of the device of FIG. 1.
Figure 3:
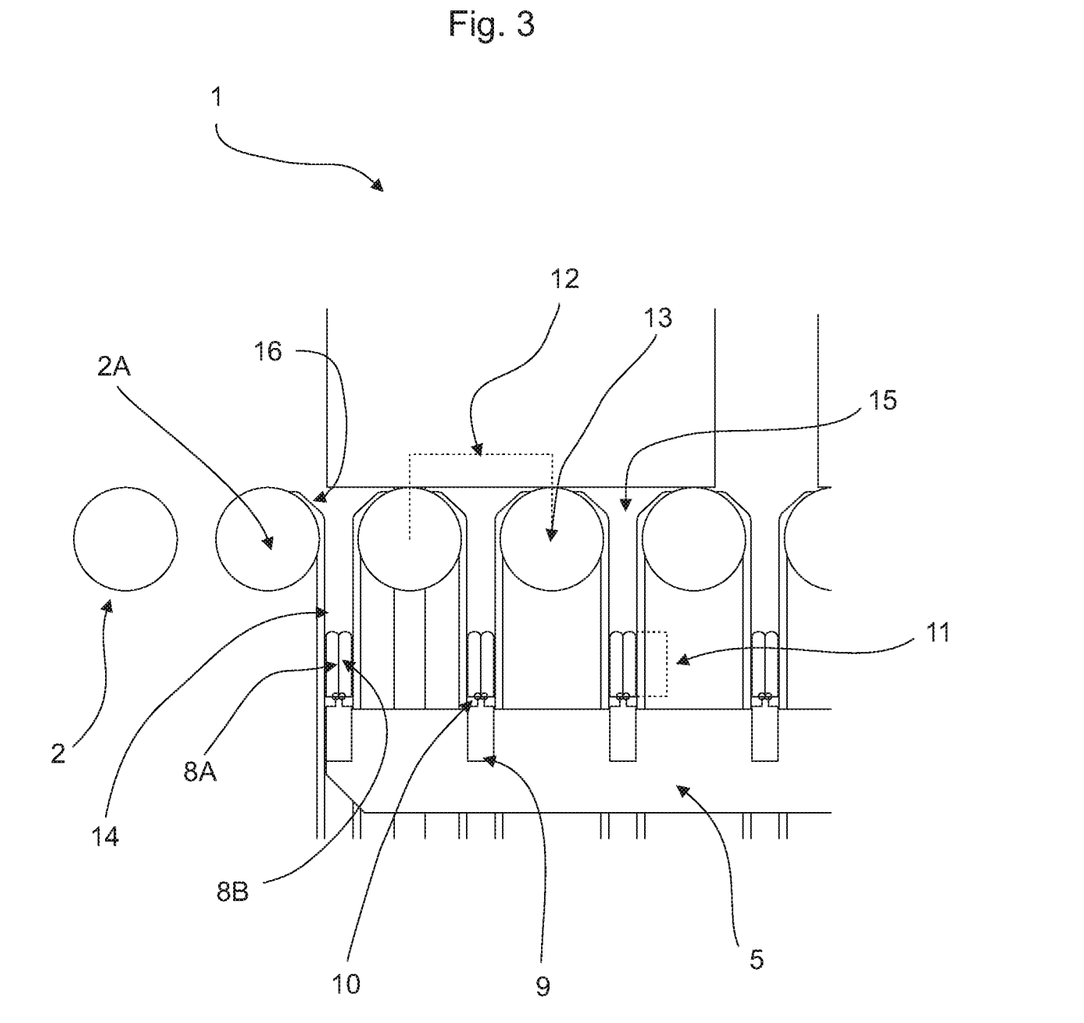
FIG. 3 is close-up detailed view of a portion of the device of FIG. 2 in the region of the rollers.
Figure 4:
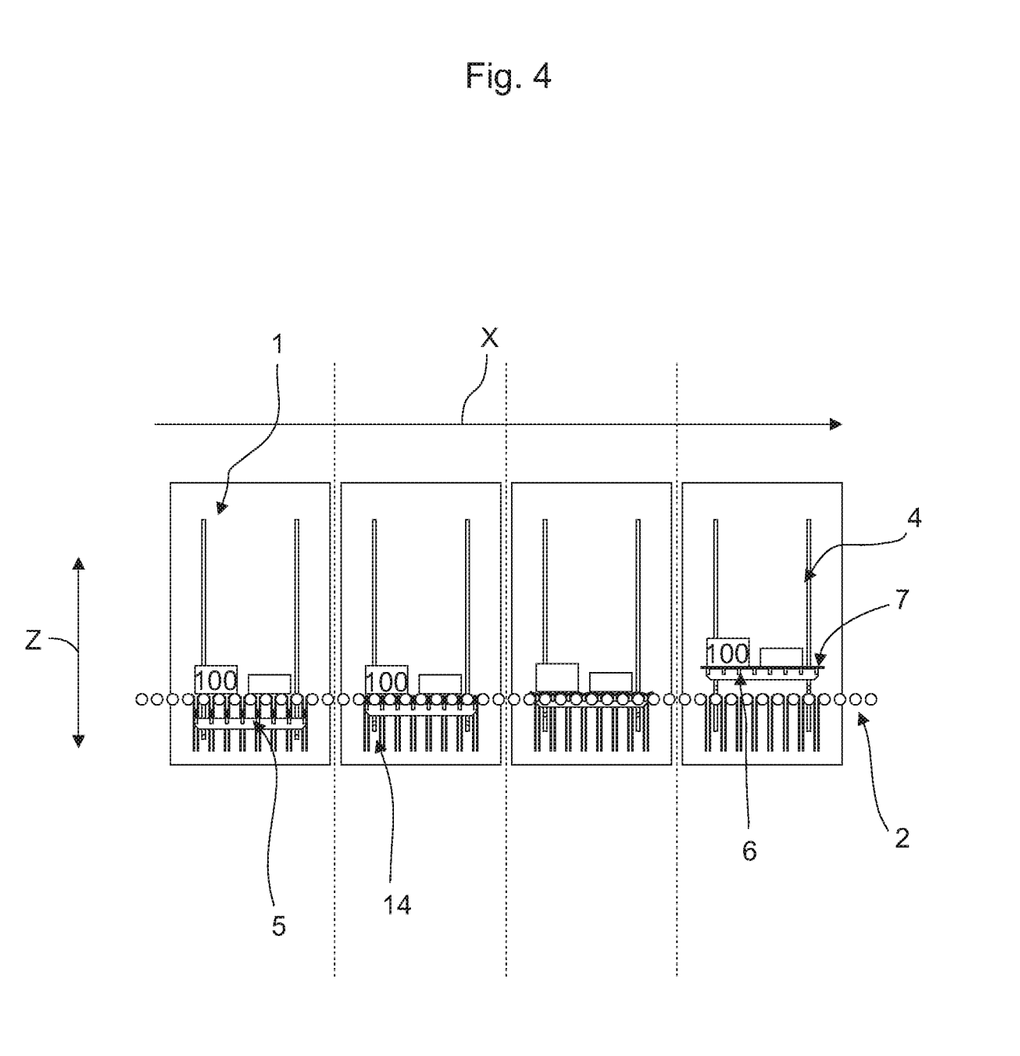
FIG. 4 is a front view of the device of FIG. 3 in different stages of the lifting process.
Figure 5:
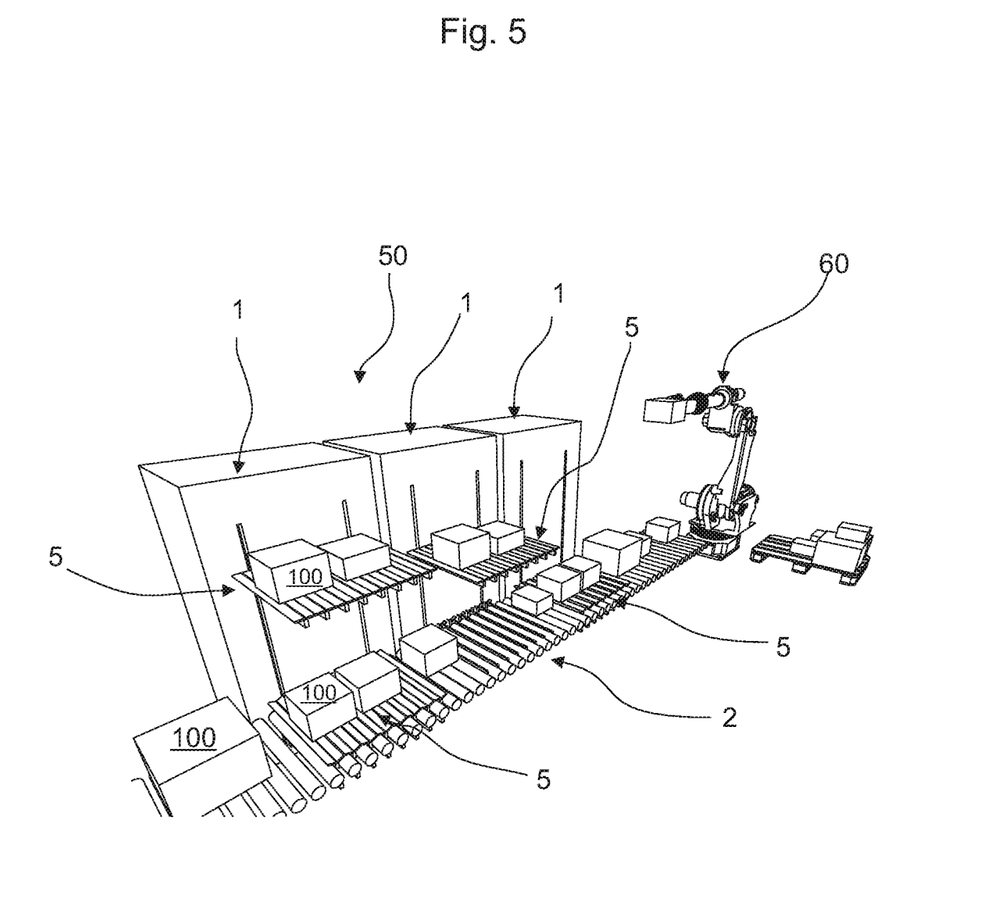
FIG. 5 is a perspective view of a plurality of devices of FIG. 1 in one possible implementation in accordance with aspects of the present invention.

It is possible to provide a plurality of forks 5, which can travel independently of one another but synchronized with one another, in the rails 4. For this purpose, the vertical guide 14 merely needs to be extended downwards in order to receive more than one fork 5 or the tines 6 thereof. A corresponding arrangement when used in a buffer 50 is shown in FIG. 5. In that case, three independent modules with the device 1 are each disposed along a longer roller conveyor 2 and are each fitted with two forks 5 disposed one above another.

Thus, by being lifted from the roller track, a plurality of articles 100 can be stored in each module and also changed in their sequence in order e.g. to supply the pick-and-place robot 60 at the end of the roller track with a desired sequence of articles 100.

It will be understood that the device 1 is also suitable for transfer or for discharge on conveyors. Further changes and modifications in the specifically described embodiments can be carried out without departing from the principles of the present invention, which is intended to be limited only by the scope of the appended claims, as interpreted according to the principles of patent law including the doctrine of equivalents.

The embodiments of the invention in which an exclusive property or privelege is claimed are defined as follows:

1. A device for lifting one or a plurality of articles from a roller conveyor having a plurality of rollers, said device comprising:
   a fork configured to be raised and lowered and having one or a plurality of spaced-apart elongate tines;
   wherein from a lowered position the fork is movable with the tines between or below the rollers of the roller conveyor in order to lift an article from the rollers as the fork and tines are being raised into a raised position with the tines forming a carrier surface for the article, wherein the tines are configured to be expanded in the direction transverse to the longitudinal extension thereof in order to form an expanded carrier surface, and wherein each tine comprises at least one support configured to be folded out transversely to the longitudinal extension thereof when expanded.

2. The device as claimed in claim 1, wherein the at least one support can be folded open by up to 90 degrees in order to form a flat carrier surface.

3. The device as claimed in claim 2, wherein each tine comprises two supports which can each be folded out.

4. The device as claimed in claim 1, wherein the width of the at least one support which can be folded out corresponds to about half the distance between the centers of adjacent rollers.

5. The device as claimed in claim 1, wherein when the fork is in the lowered position the tines are disposed such that articles can be conveyed past and over the tines on rollers of the conveyor.

6. The device as claimed in claim 1, wherein the at least one support is held by a vertical guide when the fork is in the lowered position.

7. The device as claimed in claim 6, wherein the vertical guide comprises a funnel-shaped inlet.

8. The device as claimed claim 1, wherein the at least one support is folded out mechanically or actively via an actuator.

9. The device as claimed in claim 1, wherein each tine comprises two supports configured to fold out transversely to the longitudinal extension thereof when expanded.

10. The device as claimed in claim 9, wherein the supports for each tine can be folded open by up to 90 degrees in opposite directions to form a flat carrier surface.

11. The device as claimed in claim 9, wherein the width of each support which can be folded out corresponds to about half the distance between the centers of adjacent rollers.

12. The device as claimed in claim 9, wherein the supports of each tine are held by a vertical guide when the fork is in the lowered position.

13. The device as claimed in claim 12, wherein the vertical guide comprises a funnel-shaped inlet.

14. A buffer system for a roller conveyor having a plurality of rollers, said buffer system comprising:
    a plurality of lifting devices for lifting articles from the roller conveyor, wherein each lifting device comprises a fork configured to be raised and lowered with the fork comprising one or a plurality of spaced-apart elongate tines;

wherein from a lowered position each fork is movable with its respective tines between or below rollers of the roller conveyor in order to lift an article from the rollers as the fork and tines are being raised into a raised position with the tines forming a carrier surface for the article, wherein the tines are configured to be expanded in the direction transverse to the longitudinal extension thereof in order to form an expanded carrier surface, and wherein each tine comprises at least one support configured to be folded out transversely to the longitudinal extension thereof when expanded.

15. The buffer system as claimed in claim 14, wherein the at least one support can be folded open by up to 90 degrees in order to form a flat carrier surface.

16. The buffer system as claimed in claim 14, wherein the width of the at least one support which can be folded out corresponds to about half the distance between the centers of adjacent rollers.

17. The buffer system as claimed in claim 14, wherein when the fork is in the lowered position the tines are disposed such that articles can be conveyed past and over the tines on rollers of the conveyor.

18. The buffer system as claimed in claim 14, wherein each tine comprises two supports configured to fold out transversely to the longitudinal extension thereof when expanded.

* * * * *

UNITED STATES PATENT AND TRADEMARK OFFICE
CERTIFICATE OF CORRECTION

PATENT NO.        : 10,723,566 B2
APPLICATION NO.   : 16/279641
DATED             : July 28, 2020
INVENTOR(S)       : Daniel Jarr, Max Reinhard Lewandoske and Daniel Huberth Page 1 of 1

It is certified that error appears in the above-identified patent and that said Letters Patent is hereby corrected as shown below:

Column 4
Line 11, the Line above the Claims "privelege" should be --privilege--

Signed and Sealed this
Twenty-second Day of December, 2020

Andrei Iancu
*Director of the United States Patent and Trademark Office*